United States Patent
Hu et al.

(10) Patent No.: US 10,511,214 B2
(45) Date of Patent: Dec. 17, 2019

(54) OSCILLATING MOTOR AND ELECTRIC CLIPPERS

(71) Applicant: Jiankun Hu, Shenzhen (CN)

(72) Inventors: Jiankun Hu, Shenzhen (CN); Jianchang Hu, Shenzhen (CN); Feiran Hu, Shenzhen (CN); Feifan Hu, Shenzhen (CN)

(73) Assignee: Jiankun Hu, Shenzhen (CN)

( * ) Notice: Subject to any disclaimer, the term of this patent is extended or adjusted under 35 U.S.C. 154(b) by 0 days.

(21) Appl. No.: 16/049,935

(22) Filed: Jul. 31, 2018

(65) Prior Publication Data

US 2018/0361601 A1    Dec. 20, 2018

Related U.S. Application Data

(63) Continuation of application No. PCT/CN2016/074161, filed on Feb. 19, 2016.

(51) Int. Cl.
*H02K 33/16* (2006.01)
*H02K 33/18* (2006.01)
*B26B 19/12* (2006.01)
*B26B 19/28* (2006.01)

(52) U.S. Cl.
CPC ............ *H02K 33/18* (2013.01); *B26B 19/12* (2013.01); *B26B 19/28* (2013.01); *B26B 19/284* (2013.01); *H02K 33/16* (2013.01)

(58) Field of Classification Search
CPC ........ H02K 33/18; H02K 33/16; B26B 19/28; B26B 19/12

USPC ........................................ 310/36, 37, 38, 39
See application file for complete search history.

(56) References Cited

U.S. PATENT DOCUMENTS

| | | | |
|---|---|---|---|
| 4,092,569 A | 5/1978 | Herr et al. | |
| 4,714,851 A * | 12/1987 | Bertram | ............... H02K 21/185 310/156.38 |
| 6,441,517 B1 * | 8/2002 | Brum | ..................... B26B 19/28 310/30 |

(Continued)

FOREIGN PATENT DOCUMENTS

| CN | 1070359 A | 3/1993 |
|---|---|---|
| CN | 1272976 A | 11/2000 |

(Continued)

*Primary Examiner* — John K Kim
(74) *Attorney, Agent, or Firm* — Wayne & Ken, LLC; Tony Hom

(57) ABSTRACT

An oscillating motor and electric clippers. The oscillating motor includes a U-shaped magnetic yoke, four permanent magnets and a swing arm. The U-shaped magnetic yoke causes end faces of two support legs to produce alternating magnetic poles with the control circuit. The four permanent magnets are fixedly mounted to an inner arm via a second magnetic yoke. The four permanent magnets are sequentially distributed on a same circumferential surface having a fulcrum being a centre of rotation. The polarities of radial end faces of the first permanent magnet and the fourth permanent magnet are the same. The polarities of radial end faces of the second permanent magnet and the third permanent magnet are the same, and the opposite of the polarity of the radial end face of the first permanent magnet. When a coil is electrified, the four permanent magnets produce torque having the same direction of rotation.

11 Claims, 12 Drawing Sheets

(56) References Cited

U.S. PATENT DOCUMENTS

| | | | | |
|---|---|---|---|---|
| 2005/0280319 A1* | 12/2005 | Pilcher | ............... | H02K 33/16 |
| | | | | 310/36 |
| 2010/0237720 A1* | 9/2010 | Taylor | ............... | A61C 17/20 |
| | | | | 310/38 |
| 2012/0119596 A1* | 5/2012 | Doll | ............... | H02K 16/02 |
| | | | | 310/36 |
| 2015/0097449 A1* | 4/2015 | Suzuki | ............... | G02B 26/10 |
| | | | | 310/37 |
| 2018/0361601 A1* | 12/2018 | Hu | ............... | H02K 33/16 |

FOREIGN PATENT DOCUMENTS

| | | | |
|---|---|---|---|
| CN | 1727134 | A | 2/2006 |
| CN | 201329597 | Y | 10/2009 |
| CN | 203357478 | U | 12/2013 |
| CN | 103784062 | A | 5/2014 |
| CN | 104009531 | A | 8/2014 |
| CN | 104500345 | A | 4/2015 |
| CN | 205453448 | U | 8/2016 |
| JP | 2001327144 | A | 11/2001 |
| JP | 2005287139 | A | 10/2005 |
| JP | 3736381 | B2 | 1/2006 |

\* cited by examiner

OSCILLATING MOTOR AND ELECTRIC CLIPPERS

TECHNICAL FIELD

The present invention relates to a motor, and more specifically, to a motor that outputs an oscillating motion.

BACKGROUND

A motor is an electromagnetic device that converts electric energy based on the law of electromagnetic induction. It is widely used in various fields and as an indispensable prime mover in today's society, it provides a motive power source for a large number of electric appliances or machines.

Electric clippers are a kind of equipment powered by motors At present, motors for electric clippers include rotating motors and oscillating motors. A rotating motor is a rotating electromagnetic machine that operates on the principle of electromagnetic induction to realize mutual conversion between to mechanical energy and electric energy. Meanwhile, the rotating motor converts rotary motion into reciprocating oscillating motion by means of a transmission mechanism. A typical transmission mechanism is for example a cam mechanism or an eccentric link structure. An oscillating motor includes a "W"-shaped iron core magnetic yoke, (one or two) permanent magnet(s), and a swing arm composed of pure iron and connected to the permanent magnet(s). Under the action of coils on the mountain-shaped iron core magnetic yoke, the swing arm sways back and forth between the mountain-shaped iron core magnetic yoke, as described in patents with publication No. CN1070359 (permanent magnet type electric clippers) and publication No. CN203357478U (electric clippers oscillating rod) and the like.

However, when reciprocating oscillating motion is outputted in such a manner that the rotating motor cooperates with the cam mechanism or the eccentric link structure, the operating current is huge, especially when starting and blocking, the operating current is abnormally large. For example, if a 3.7-volt DC rotating brush motor is used, the operating current is 800-1200 mA, the power is about 4 watts, the swing frequency varies greatly with the resistance, the current during blocking exceeds 2000 mA, and the life of the motor is about 400 hours.

In the oscillating motor, the magnetic flux of the middle support magnetic yoke of the mountain-shaped iron core magnetic yoke is large, and the magnetic flux of the end support magnetic yokes is small. The end support magnetic yokes in operation have only a single attraction force or a short repulsive force. The middle support magnetic yoke has both attraction and repulsive forces for a short time only, and only an attraction force at other times, which is larger than the attraction or repulsive force of the end support magnetic yokes. For such electric clippers, to ensure sufficient torque, the coils must be connected to 220V AC, and the power goes to 8-12 watts. At the same time, the swing arm oscillates with the fixed frequency of 220V AC, and the resonance of the resonant spring provides insurance. If such structure is driven by a rechargeable battery at a low voltage, the torque is too small to produce the operating torque, that is, the electric clippers cannot be designed to be wireless and portable.

SUMMARY OF THE INVENTION

The present application provides a novel oscillating motor and electric clippers.

The oscillating motor provided by the present application includes:

a U-shaped magnetic yoke with a first support leg and a second support leg, wherein the first support leg and the second support leg are respectively wound with coils;

a control circuit, electrically connected to the coils, and producing alternating pulses, so that end faces of the two support legs of the U-shaped magnetic yoke producing alternating magnetic poles;

a swing arm swingable around a fulcrum; the swing arm is substantially arranged in an extending direction of the first support leg and the second support leg, one end of the swing arm near the U-shaped magnetic yoke being an inner arm, the other end of the swing arm away from the U-shaped magnetic yoke being an outer arm;

a second magnetic yoke mounted at an end of the inner arm near the U-shaped magnetic yoke; and a first permanent magnet, a second permanent magnet, a third permanent magnet, and a fourth permanent magnet fixedly mounted on the second magnetic yoke; The first permanent magnet, the second permanent magnet, the third permanent magnet, and the fourth permanent magnet are sequentially spaced and distributed on the same circumference centered on the fulcrum; radial end faces of the first permanent magnet and the fourth permanent magnet have the same polarity, the radial end faces of the second and the third permanent magnet have the same polarity, the radial end faces of the first and the second permanent magnet have opposite polarities and to the end face of the first support leg; the radial end faces of the third and the fourth permanent magnet have opposite polarities and are arranged corresponding the end face of the second support leg; an air gap is provided between the end faces of the first permanent magnet and the second permanent magnet and of the corresponding first support leg and an air gap is provided between the end faces of the third permanent magnet and the fourth permanent magnet and of the corresponding second support leg.

As a further improvement of the oscillating motor, a gap between the first permanent magnet and the second permanent magnet is smaller than a width of the end face of the first support leg, and a gap between the third permanent magnet and the fourth permanent magnet is smaller than a width of the end face of the second support leg.

As a further improvement of the oscillating motor, the width of the radial end faces the permanent magnets is the same as the end face width of the U-shaped yoke leg.

As a further improvement of the oscillating motor, a circular arc surface is provided at the end faces of the first support leg matching with a circumference formed when the first permanent magnet and the second permanent magnet swing and a circular arc surface is provided at the end faces of the second support leg matching with a circumference formed when the third permanent magnet and the fourth permanent magnet swing.

As a further improvement of the oscillating motor, an elastic body is provided on both sides of the swing arm for absorbing a moment of inertia of the swing arm in a swing position, and a force elastic characteristic curve of the elastic body is a quadratic or high order curve.

As a further improvement of the oscillating motor, the elastic body is a silicone member or a rubber member having a shape of sphere, elliptical sphere, cylinder, elliptical cylinder or semicircle.

As a further improvement of the oscillating motor, a detecting element for detecting a in-position state of the first permanent magnet or the fourth permanent magnet is respectively provided at an outer side of the U-shaped magnetic yoke and on a moving track of the first permanent magnet and/or the fourth permanent magnet; and the detecting element is connected to the control circuit.

As a further improvement of the oscillating motor, the detecting element is a HALL element.

As a further improvement of the oscillating motor, the oscillating motor further comprises a resonant elastic member, wherein an end of the resonant elastic member is fixed at the fulcrum of the swing arm and the other end the resonant elastic member is connected to the outer arm or the inner arm.

As a further improvement of the oscillating motor, a force output portion with an arc-shaped outer wall is provided at the outer arm.

As a further improvement of the oscillating motor, a connecting rod for force output is provided at the outer arm and/or the inner arm; and the connecting rod is perpendicular to a swinging plane of the swing arm.

The electric clippers provided by the present application include an oscillating motor and a cutter head. If adopts any of the oscillating motors, the cutter head is connected to the outer arm of the swing arm.

As a further improvement of the electric clippers, a force output portion is provided at the outer arm; the force output portion has an arc-shaped outer wall; a toggle connecting body is provided at the cutter head; a groove matching the force output portion is provided at the toggle connecting body; and the force output portion is mounted within the groove.

The beneficial effects of the present application are as follows:

The oscillating motor provided by the present application includes a U-shaped magnetic yoke, four permanent magnets and a swing arm. The two support legs of the U-shaped magnetic yoke are respectively wound with coils, and the end faces of the two support legs can produce alternating magnetic poles with the control circuit. The swing arm can revolve around the fulcrum, and one end thereof near the U-shaped magnetic yoke as an inner arm, and the other end away from the U-shaped magnetic yoke as an outer arm. The four permanent magnets are fixedly mounted on the inner arm via the second magnetic yoke. The four permanent magnets are the first permanent magnet, the second permanent magnet, the third permanent magnet, and the fourth permanent magnet respectively, which are sequentially distributed on the same circumference centered on the fulcrum. The radial end faces of the first and the fourth permanent magnet have the same polarity, the radial end faces of the second and the third permanent magnet have the same polarity, the radial end faces of the first and the second permanent magnet have opposite polarities and correspond to the end face of the first support leg; the radial end faces of the third and the fourth permanent magnet have opposite polarities and correspond to the end face of the second support leg, and there is an air gap between the permanent magnets and the U-shaped magnetic yoke. When a coil is electrified, the four permanent magnets produce torque in the same direction of rotation. After electrified, if the first and third permanent magnets produce the same magnitude of magnetic attraction force to the U-shaped magnetic yoke, the second and fourth permanent magnets produce the same magnitude of magnetic repulsive force to the U-shaped magnetic yoke; if inversely electrified, the first and third permanent magnets produce the same magnitude of magnetic repulsive force to the U-shaped magnetic yoke, then the second and fourth permanent magnets produce the same magnetic of magnetic attraction force to the U-shaped magnetic yoke. Each support leg of the U-shaped magnetic yoke corresponds to two permanent magnets, and such, redundant design for permanent magnet is different from prior art in magnetic circuit design. And it has a larger torque than existing motors of the same power, a larger magnetic flux and a correspondingly reduced driving power. Mechanical units that need to reciprocate within a small moving distance, can be driven directly by such motors without a cam mechanism or an eccentric link structure, but with low noise and stable current And it doesn't need such large current as for a rotating motor to get started and the current changes just in a small way when stalls, and its frequency of swinging does not vary with the resistance. The motor can be powered by a rechargeable battery, which is convenient for a portable design.

The electric clippers provided by the present application adopt the above-mentioned oscillating motor, and only need a low-voltage direct current (such as 3.7V). The operating current is about 500 mA, the power is about 2 watts, the current during blocking is about 700 mA, the driving current is stable and the swing frequency does not vary with the resistance. With a lower operating current than that of a brushed DC motor, it is more energy-efficient. It can be charged by lithium battery, and there is no large current when starting and blocking, and the battery life is longer, So this design is energy-saving and environment-friendly.

DETAILED DESCRIPTION

Embodiment 1

The first embodiment provides an oscillating motor that can output a reciprocating oscillating motion.

Figure 1:
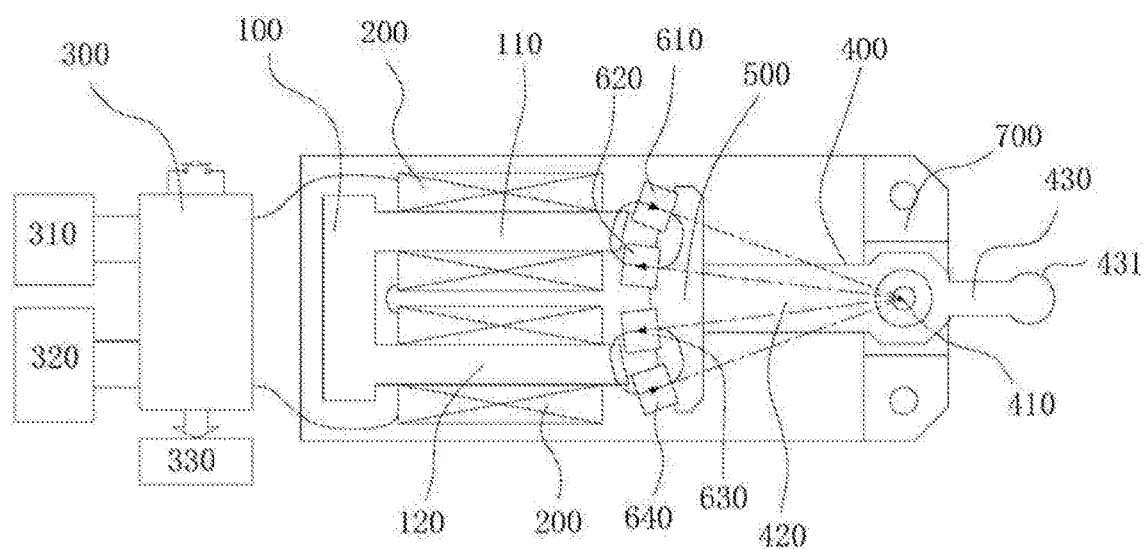
FIG. 1 is a schematic structural view of an oscillating motor of an embodiment of the present application.
Figure 2:
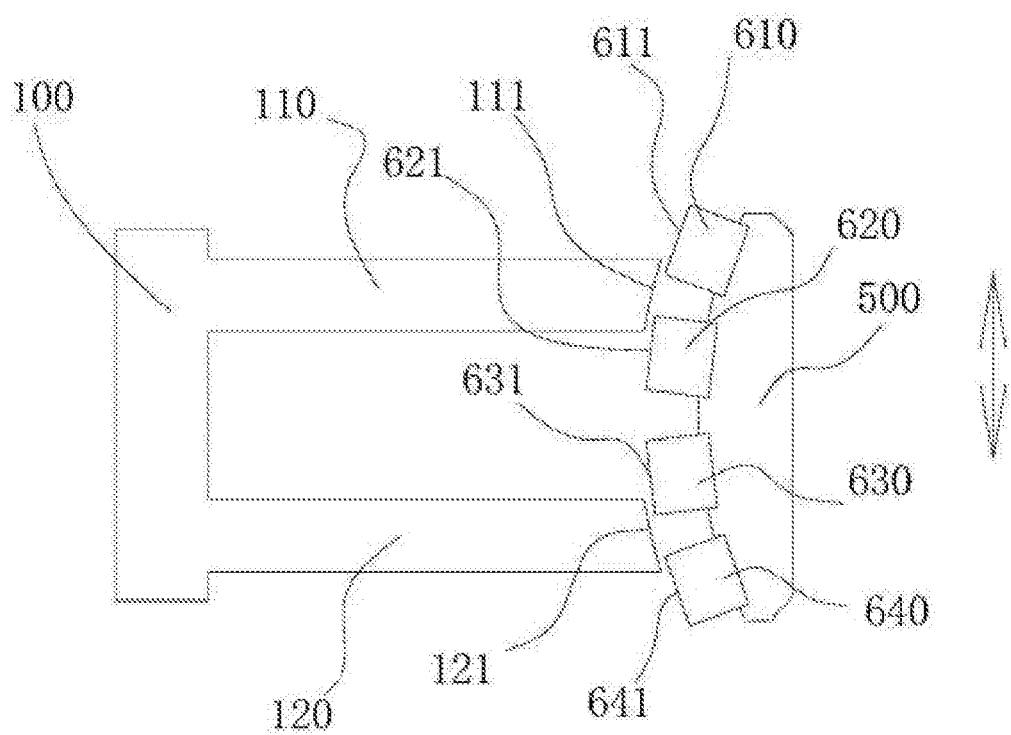
FIG. 2 is a schematic view showing the cooperation of permanent magnets and U-shaped magnetic yoke support legs in the embodiment shown in FIG. 1.

Referring to FIGS. 1 and 2, the oscillating motor includes:

a U-shaped magnetic yoke 100 with a first support leg 110 and a second support leg 120, wherein the first support leg 110 and the second support leg 120 are respectively wound with coils 200;

a control circuit 300, which is electrically connected to the coils 200, and produces alternating pulses, so that end faces 111, 121 of the two support legs of the U-shaped magnetic yoke 100 produce alternating magnetic poles;

a swing arm 400 swing around a fulcrum, one end of the swing arm 400 near the U-shaped magnetic yoke 100 as an inner arm 420, the other end of the swing arm 400 away from the U-shaped magnetic yoke 100 as an outer arm 430;

a second magnetic yoke 500 (which is referred to as a second magnetic yoke 500 in order to distinguish it from the U-shaped magnetic yoke 100), mounted at the end of the inner arm 420 near the U-shaped magnetic yoke 100; and four permanent magnets, fixedly mounted on the second magnetic yoke 500 (e.g., glued); the four permanent magnets being sequentially distributed on the same circumference centered on the fulcrum, and being the first permanent magnet 610, the second permanent magnet 620, the third permanent magnet 630, and the fourth permanent magnet 640 in the order of arrangement; radial end faces 611, 641 of the first permanent magnet 610 and the fourth permanent magnet 640 have the same polarity, radial end faces 621, 631 of the second permanent magnet 620 and the third permanent magnet 630 have the same polarity, the radial end faces 611, 621 of the first permanent magnet 610 and the second permanent magnet 620 have opposite polarities and being provided corresponding to the end face 111 of the first support leg; the radial end faces 631, 641 of the third permanent magnet 630 and the fourth permanent magnet 640 have opposite polarities and being provided corresponding to the end face 121 of the second support leg 120; the end faces of the four permanent magnets and there is an air gap between the end faces of the permanent magnets and of the corresponding support legs.

Wherein, the four permanent magnets sequentially distributed on the same circumference centered on the fulcrum mean that the radii of the four permanent magnets to the fulcrum are roughly equal, that is, radially distributed along a swing center line.

The U-shaped magnetic yoke 100, the swing arm 400, the second magnetic yoke 500, and the permanent magnets are mounted in a housing 700, wherein the fulcrum of the swing arm 400 is a swing shaft 410 fixedly mounted on the housing 700, and the swing arm 400 is fitted over the swing shaft 410. The housing 700 referred to herein may be a housing dedicated to the motor or a housing of an electric appliance using the motor.

When the coils 200 are electrified, the four permanent magnets will produce torque in the same direction of rotation. After being electrified, if the first and third permanent magnets 610, 630 produce the same magnitude of magnetic attraction force to the U-shaped magnetic yoke 100, the second and fourth permanent magnets 620, 640 produce the same magnitude of magnetic repulsive force to the U-shaped magnetic yoke 100; after being inversely electrified, the first and third permanent magnets 610, 630 produce the same magnitude of magnetic repulsive force to the U-shaped magnetic yoke 100, and the second and fourth permanent magnets 620, 640 produce the same magnetic of magnetic attraction force to the U-shaped magnetic yoke 100. Each support leg of the U-shaped magnetic yoke corresponds to two permanent magnets, and such permanent magnet redundancy design is a magnetic circuit design different from the prior art, and has a larger torque than existing motors of the same power, a larger magnetic flux and a correspondingly reduced driving power.

The four permanent magnets are simultaneously subjected to the force of the U-shaped magnetic yoke 100 in the same swinging direction, which ensures that the swing arm 400 finishes the entire reciprocating swing process without an external force.

Figure 3:
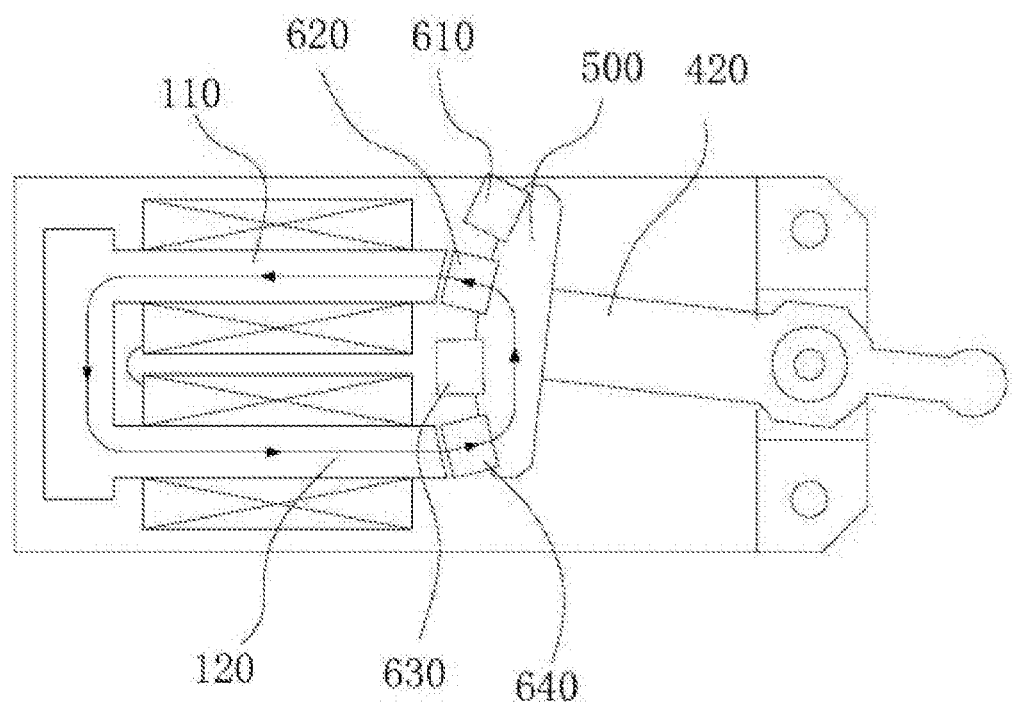
FIG. 3 is a schematic view of the embodiment shown in FIG. 1 in an electrified state.

Particularly, referring to FIGS. 1, 2 and 3, it is assumed that the end faces of the first permanent magnet 610 and the fourth permanent magnet 640 are the N pole, and the end faces of the second permanent magnet 620 and the third permanent magnet 630 are the S pole. When the coils 200 are electrified, if the end face of the first support leg 110 is N pole and the end face of the second support leg 120 is S pole, the N pole of the first support leg 110 will produce an attraction force to the S pole of the second permanent magnet 620, and a repulsive force to the N pole of the first permanent magnet 610. Similarly, the S pole of the second support leg 120 will produce an attraction force to the N pole of the fourth permanent magnet 640 and a repulsive force to the S pole of the third permanent magnet 630, thereby swinging the swing arm 400 from the position shown in FIG. 1 to the position shown in FIG. 3, forming a first swing.

Figure 4:
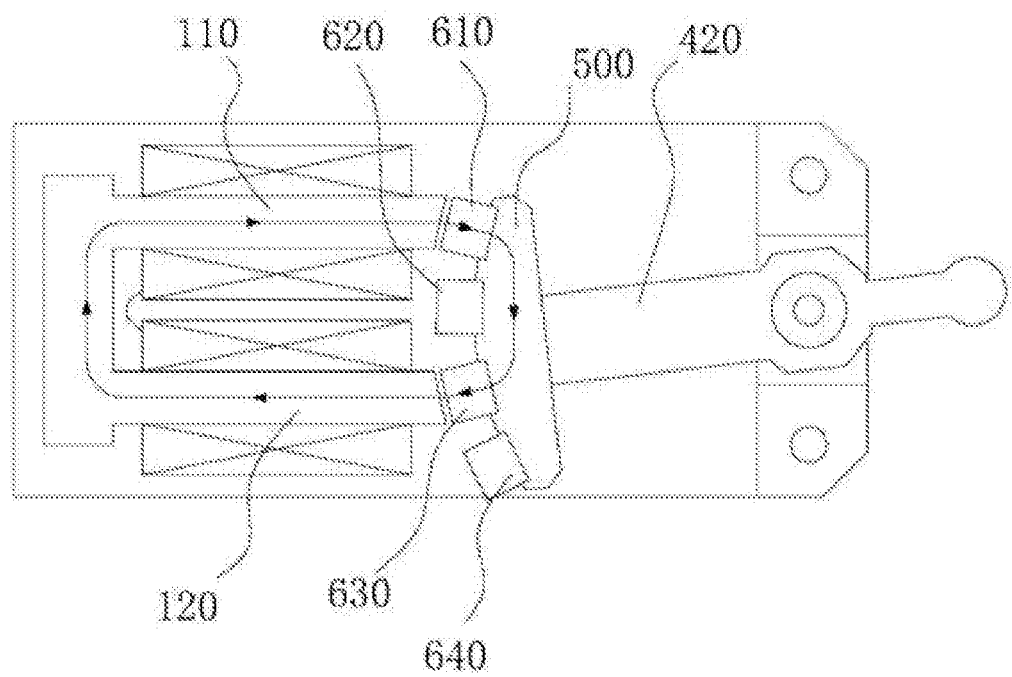
FIG. 4 is a schematic view of the embodiment shown in FIG. 1 in an opposite electrified state to FIG. 3.

When the current direction in the coils 200 changes, as shown in FIG. 4, at that time, the end face of the first support leg 110 is the S pole, and the end face of the second support leg 120 is the N pole, and the S pole of the first support leg 110 produces a repulsive force to the S pole of the second permanent magnet 620 and produces an attraction force to the N pole of the first permanent magnet 610. Similarly, the N pole of the second support leg 120 will produce a repulsive force to the N pole of the fourth permanent magnet 640, and produce an attraction force to the S pole of the third permanent magnet 630, thereby swinging the swing arm 400 from the position shown in FIG. 3 to the position shown in FIG. 4, forming a second swing.

In summary, the coils 200 are connected to the control circuit 300, and the control circuit 300 produces alternating pulses with adjustable pulse width, causing the end face of the U-shaped magnetic yoke 100 to produce alternating magnetic poles, so that the permanent magnets produce an attraction torque and repulsive torque, or a repulsive torque and attraction torque, to drive the swing arm 400 to swing, thereby driving the corresponding mechanical unit to be swung by means of the swing arm 400.

Further, as shown in FIG. 2, the gap between the first permanent magnet 610 and the second permanent magnet 620 may be made smaller than the width of the end face 111 of the first support leg 110, and the gap between the third permanent magnet 630 and the fourth permanent magnet 640 may be made smaller than the width of the end face 121 of the second support leg 120 to ensure that the support legs of the U-shaped magnetic yoke 100 have sufficient applied force on the permanent magnets.

The width of each of the permanent magnets may be the same as or different from the width of the end faces of the support legs of the U-shaped magnetic yoke 100. The width referred to herein means the width in the direction indicated by the arrow in FIG. 2.

In order to reduce the air gap, as shown in FIG. 2, the end faces 111, 121 of the first support leg 110 and the second support leg 120 may have a circular arc surface matching the corresponding circumference when the permanent magnets swing, that is, the circular arc surface formed by the end faces 111, 121 of the first support leg 110 the and the second support leg 120 and a part of the arc surface of the circumference formed by the permanent magnets have an air gap only there between.

Figure 5:
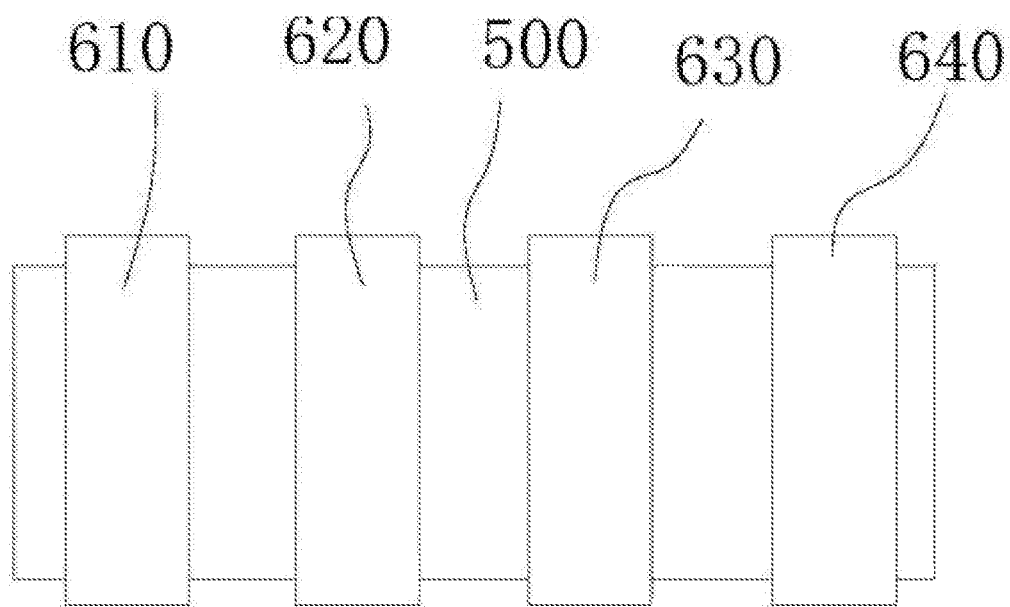
FIG. 5 is a first schematic expanded view showing the radial end faces of four permanent magnets in the embodiment shown in FIG. 1.
Figure 6:
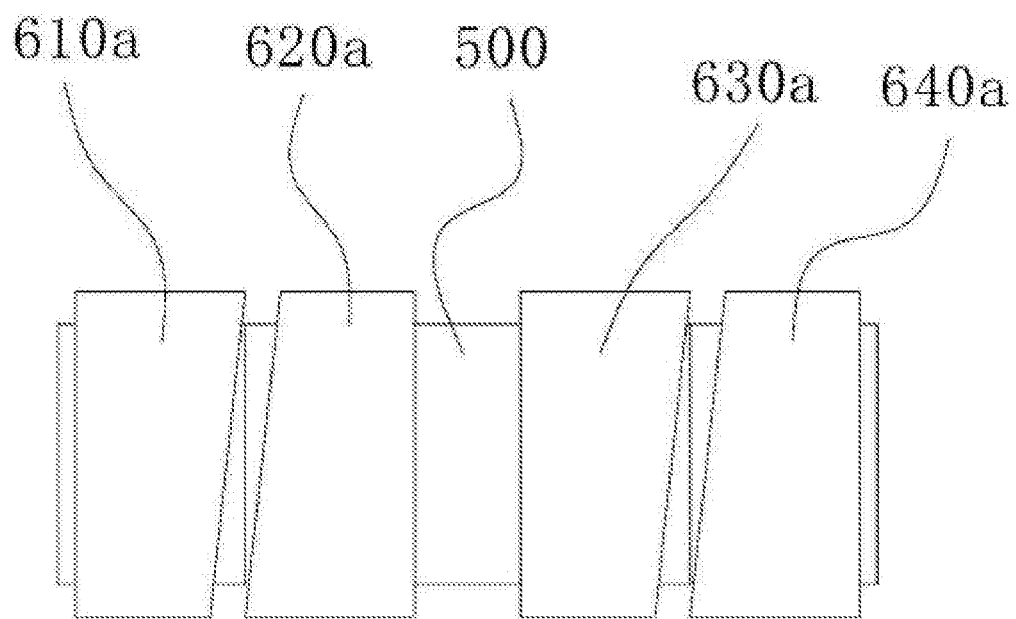
FIG. 6 is a second schematic expanded view showing the radial end faces of the four permanent magnets in the embodiment shown in FIG. 1.
Figure 7:
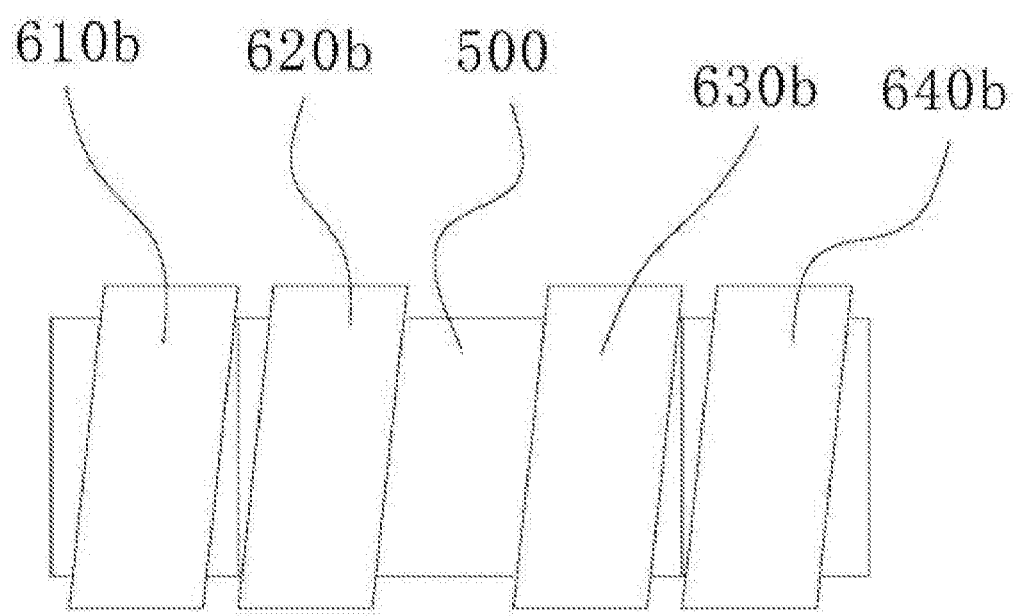
FIG. 7 is a third schematic expanded view showing the radial end faces of the four permanent magnets in the embodiment shown in FIG. 1.

Wherein, referring to FIG. 5, the radial end faces of the four permanent magnets are arranged as shown in FIG. 5, and are roughly rectangular. In addition, the radial end faces of the permanent magnets may be made into other shapes. As shown in FIG. 6, the radial end faces of the first permanent magnet 610a and the second permanent magnet 620a the adjacent sides are inclined and parallel to each other, and the radial end faces of the third permanent magnet 630a and the fourth permanent magnet 640a are provided such that the adjacent sides are inclined and parallel to each other, that is, the second permanent magnet 620a and the fourth permanent magnet 640a are roughly right angled trapezoids provided in the same direction, and the first permanent magnet 610a and the third permanent magnet 630a are also right angled trapezoids of the same shape in a direction opposite to that of the second permanent magnet 620a and the fourth permanent magnet 640a; or, as shown in FIG. 7, the radial end faces of the four permanent magnets are all set to be inclined and parallel to each other and are each roughly parallelogram.

In the permanent magnet arrangement diagram shown above, the permanent magnets are staggered and distributed, thereby improving the output torque curve and making the output torque stable.

Further, referring to FIG. 1, the outer arm 430 has a force output portion 431, and the force output portion 431 has a curved outer wall which can act on an actuator to drive the actuator to oscillate.

The outer arm 430 of the swing arm 400 is an output arm. An outer arm of force is smaller than an inner arm of force. The distance of inner arm of force is the distance from the radial end face of a permanent magnet to the center of the swing shaft 410, and the distance of the external arm of force is the distance from the center of the swing shaft 410 to the center of the force output portion 431 of the outer arm 430. Here, the ratio of the length of the inner arm to that of the outer arm can also be designed according to the demand for the amplitude of the swing.

Figure 8:
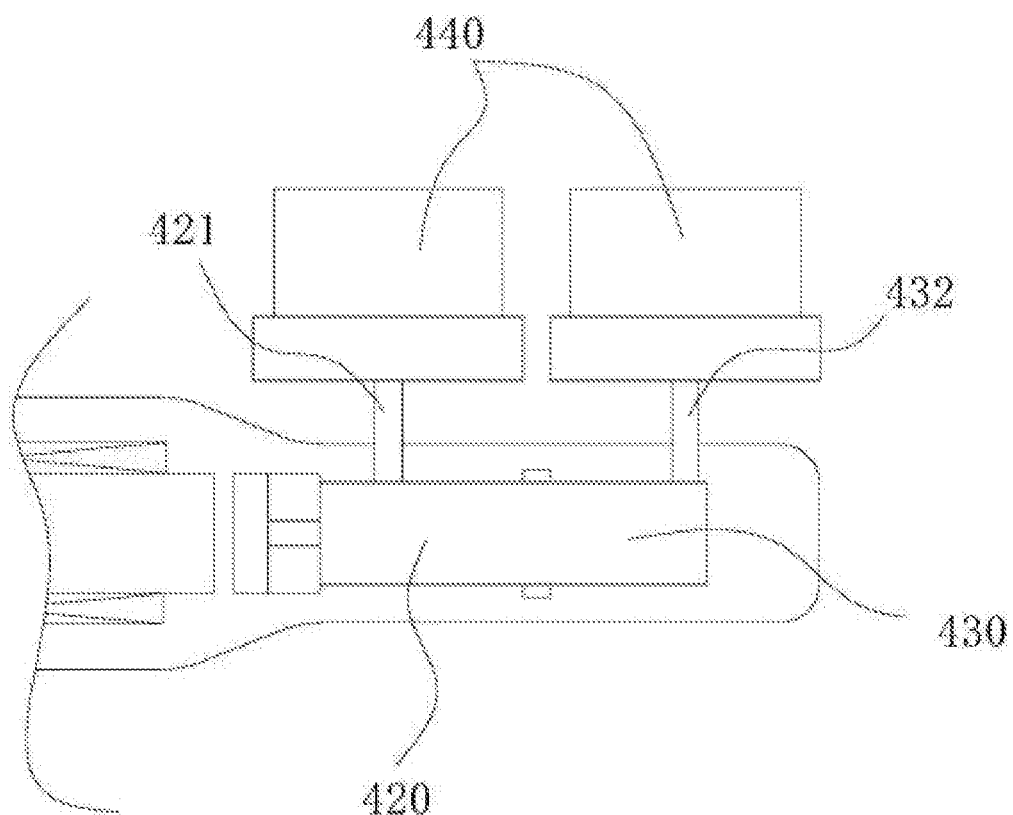
FIG. 8 is a schematic structural view of another embodiment of a swing arm output portion in the embodiment shown in FIG. 1.

In addition, referring to FIG. 8, connecting rods 432, 421 for force output may also be configured on the outer arm 430 and/or the inner arm 420. The connecting rods 432, 421 are perpendicular (including the case where a basically vertical angle is formed) to the swing plane of the swing arm 400, and when the swing arm 400 swings, the connecting rods 432, 421 and an actuator 440 mounted on the connecting rods 432, 421 are driven to swing.

During each swing, all the four permanent magnets are actually subjected to the swing force in the same direction, output torque=output force external force arm=(F1+F2+F3+F4) internal force arm, wherein F1, F2, F3 and F4 are the forces acting on the four permanent magnets by the U-shaped magnetic yoke 100, respectively.

Referring to FIG. 1, in the power-off state of the oscillating motor, the first and second permanent magnets 610, 620 and the first support leg 110 form a closed magnetic path through the air gap, and the third and fourth permanent magnets 630, 640 and the second support leg 120 form a closed magnetic path through the air gap, thereby avoiding magnetic leakage. Moreover, the permanent magnets and the second magnetic yoke 500 are mounted on the swing arm 400, so that other portions of the swing arm 400 do not affect the magnetic field.

In addition, referring to FIG. 1, a rechargeable battery 310 and a charging module 320 may be further included, the rechargeable battery 310 is used for power supply, and the charging module 320 is connected to the control circuit for charging the rechargeable battery 310.

The control circuit may further include a status indication module 330 and a switch, the status indication module 330 is used for indicating the operating state of the motor, and the switch is used for providing a trigger signal to the control circuit to control the turning-on/turning-off of the motor.

Further, the control circuit 300 can determine the number of mechanical oscillations by counting energization pulses of the coils, and output signals to correspondingly indicate the operating condition of the mechanical unit.

The swing arm of the oscillating motor swings around the fulcrum, and the life of the fulcrum and swing arm cooperation structure is the life of the motor. For example, the swing arm is mounted on the fulcrum through a bearing, and the life of the bearing is the life of the motor, whereby the life of the motor is extremely long and cannot be compared with existing brushed DC motors. Or the swing arm can be directly fitted over the fulcrum, and at the time the life of the socket structure is the life of the motor.

In addition to driving electric clippers, the oscillating motor shown in this embodiment can also drive various mechanical units that need to reciprocate and have a small moving distance. The oscillating motor does not need a cam mechanism or an eccentric link structure, with small noise and stable current, the current does not change much during blocking, and the swing frequency does not vary with the resistance.

Embodiment 2

The second embodiment provides another oscillating motor.

Figure 9:
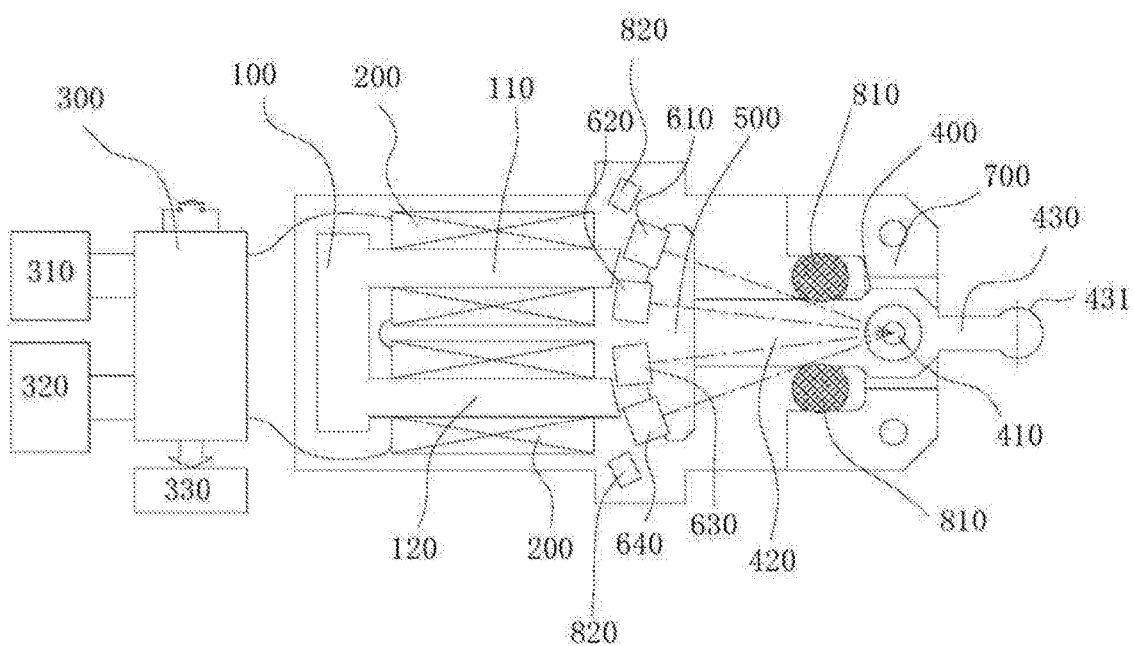
FIG. 9 is a schematic structural view of a second embodiment of the oscillating motor of the present application.

Referring to FIG. 9, the oscillating motor is improved on the basis of the structure shown in the first embodiment.

Specifically, an elastic body 810 is provided on both sides of the swing arm to absorb the moment of inertia of the swing arm 400 in the swing position, and the force elastic characteristic of the elastic body 810 is a quadratic or high order curve.

Wherein, the elastic body 810 is mainly used to absorb the moment of inertia of the swing arm 400 under no-load condition, and the elastic force thereof increases with the compression stroke. Before the position is reached, the elastic force is small, and it rapidly increases when approaching the position. The elastic characteristic of the elastic body 810 can ensure that it does not exert excessive influence on the swing of the swing arm 400 under load (the swinging distance of the swing arm 400 is attenuated under load), and produces a large restoring force only when the swing arm 400 under no-load condition excessively squeezes the elastic body 810, preventing the swing arm 400 under no-load condition from hitting surrounding components.

The elastic body 810 can be mounted on either side of the inner arm 420 and/or the outer arm 430. The elastic body 810 is mounted between the inner arm 420 and the housing 700 in this embodiment.

The elastic body 810 may be a silicone member or a rubber member in the shape of a sphere, an elliptical sphere, a cylinder, an elliptical cylinder or a semicircle.

A detecting element 820 for detecting the in-position state of the first permanent magnet 610 or the fourth permanent magnet 640 may be provided outside the U-shaped magnetic yoke 100 and on the moving track of the first permanent magnet 610 and/or the fourth permanent magnet 640, and the detecting element 820 is connected to the control circuit 300.

The detecting element 820 can detect whether the first permanent magnet 610 and/or the fourth permanent magnet 640 reach the detecting position or the time of reaching the detecting position, thereby determining the magnitude of the resistance, and further changing the magnitude of the current by changing the electrifying pulse width. For example, if the first permanent magnet 610 and/or the fourth permanent magnet 640 take long to reach the position, it means that the resistance is large, and then the control circuit 300 can control and increase the current, and conversely, reduce the current.

Of course, the detecting element 820 can be a Hall element, and can also be another detecting element 820 that can be used for in-position detection.

In this way, the control circuit 300 can change the driving current by analyzing the torque variation of the driving unit, thereby reaching driving stability and reducing power consumption.

Embodiment 3

The third embodiment provides another oscillating motor.

Figure 10:
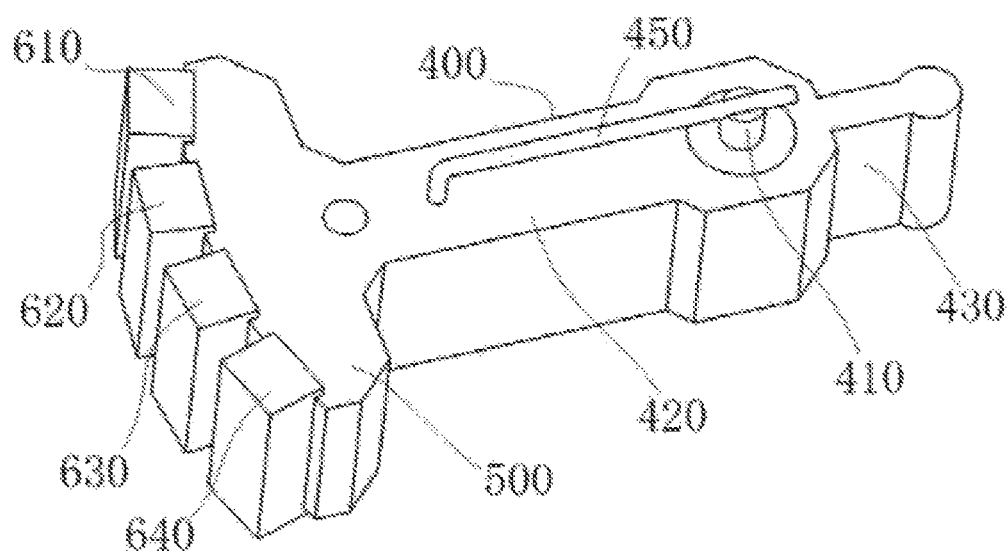
FIG. 10 is a schematic structural view of a third embodiment of the oscillating motor of the present application.
Figure 11:
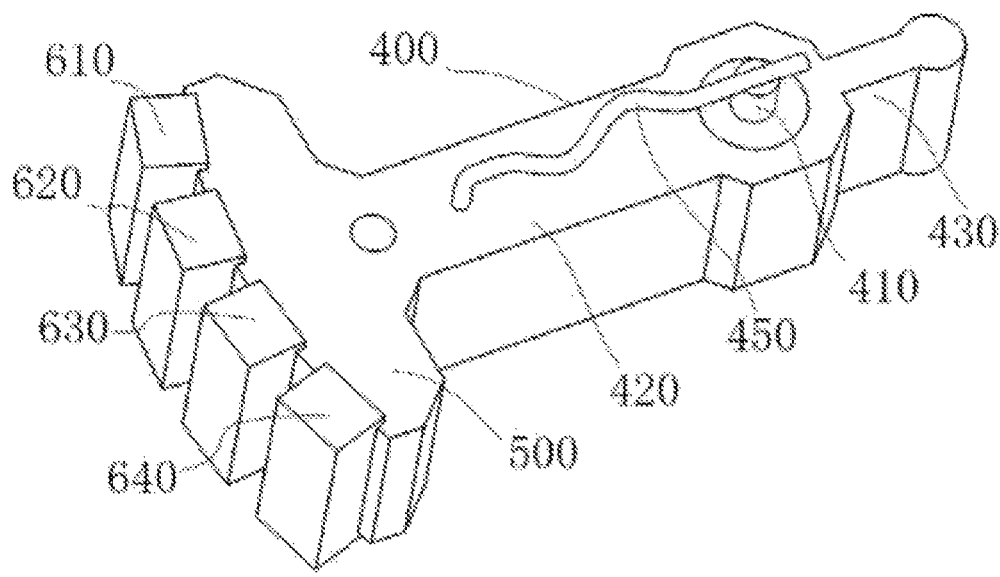
FIG. 11 is a schematic view showing another shape of a resonant elastic member in the embodiment shown in FIG. 10.

Referring to FIG. 10, the oscillating motor is improved on the basis of the structure shown in Embodiment 1, and a resonant elastic member for producing resonance at a constant swing frequency is added.

Specifically, the resonant elastic member is fixed at one end on the fulcrum of the swing arm and is connected to the other end to the outer arm or the inner arm.

Further, the resonant elastic member shown in FIG. 10 is a linear spring steel wire. Further, other shapes of elastic members may be used instead, for example, the central portion of the resonant elastic member as shown in FIG. 10 is curved.

Embodiment 4

Embodiment 4 provides electric clippers.

Figure 12:
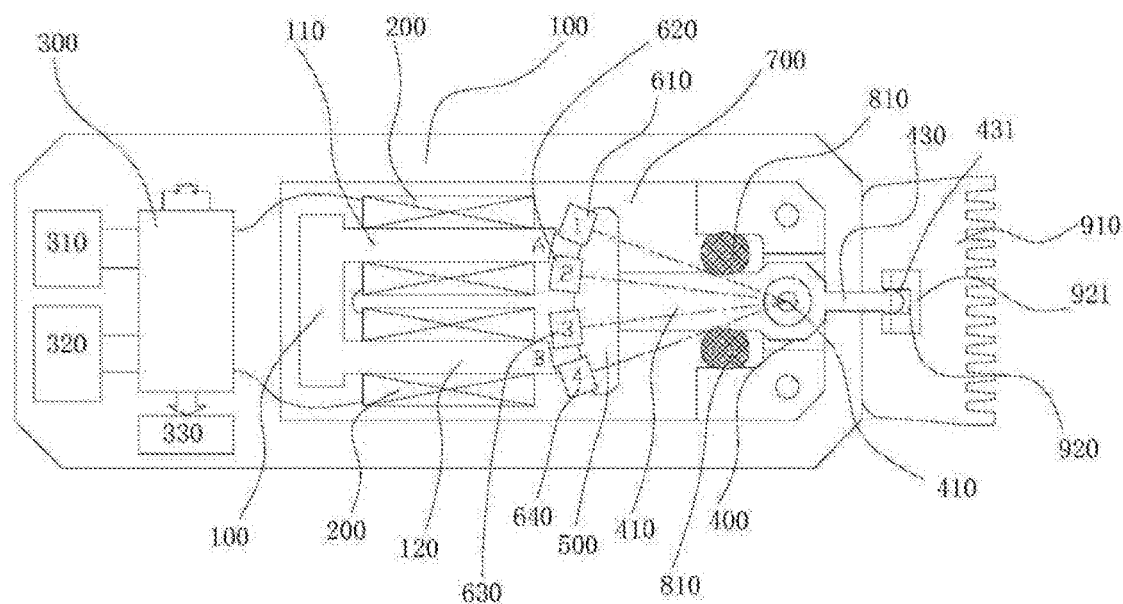
FIG. 12 is a schematic structural view of an embodiment of electric clippers of the present application.

Referring to FIG. 12, the electric clippers include an oscillating motor and a cutter head, and the oscillating motor can output a reciprocating oscillating motion to drive the reciprocating oscillating motion of the cutter head, thereby making haircut done.

The oscillating motor can adopt any structure shown in the above embodiments, wherein the cutter head is connected to the outer arm of the swing arm. Specifically, the outer arm 430 has a force output portion 431, and the force output portion 431 has an arc-shaped outer wall. A cutter head 910 has a toggle connecting body 920, and the toggle connecting body 920 has a groove 921 matching the force output portion 431. The force output portion 431 is mounted within the groove 921, and the arc-shaped outer wall can act on the toggle connecting body 920 to drive the cutter head 910 to swing.

The electric clippers shown in this embodiment only need a low-voltage direct current (such as 3.7V), the operating current is about 750 mA, the power is about 2 watts, the current during blocking is about 700 mA, and the driving current is stable. There is no need for large current during start and blocking like in a rotating motor, and the swing frequency does not vary with the resistance. The life of the motor is abnormally long, and the operating current thereof is lower than that of the brushed DC motor, and the energy saving effect is obvious. The rechargeable lithium battery can be used, and there is no need for large current when starting and blocking, and the battery life is longer, which is an energy-saving and environmentally friendly design.

Further, the control circuit 300 can determine the number of times the cutter head swing by counting the electrifying pulses of the coils, and output signals to correspondingly indicate the lubrication of the cutter head, thereby preventing the cutter head from generating heat and wearing out.

The invention has been described above by way of specific examples, which are intended to facilitate the understanding of the invention rather than limit the invention. Those of ordinary skill in the art may modify the specific embodiments based on the idea of the invention.

What is claimed is:

1. An oscillating motor, comprising:
   a U-shaped magnetic yoke having a first support leg and a second support leg, and the first support leg and the second support leg are wound with coils;
   a control circuit electrically connected to the coils and generating alternating pulses to generate alternating magnetic poles at end faces of the first support leg and the second support leg of the U-shaped magnetic yoke;
   a swing arm swingable around a fulcrum; wherein the first support leg and the second support leg respectively extend outward from a base portion of the U-shaped magnetic yoke so as to form a U-shaped structure; the swing arm is substantially arranged in an extending direction of the first support leg and the second support leg; the swing arm is bounded by the fulcrum, an end of the swing arm close to the U-shaped magnetic yoke is an inner arm and the other end of the swing arm remote from the U-shaped magnetic yoke is an outer arm; the inner arm levers the outer arm to swing around the fulcrum in a swinging plane where the swing arm locates under the action of electromagnetic force;
   a second magnetic yoke mounted at one end of the inner arm close to the U-shaped magnetic yoke for forming magnetic pathways; wherein the second magnetic yoke and the swing arm form a T-shaped structure; and
   a first permanent magnet, a second permanent magnet, a third permanent magnet, and a fourth permanent magnet being fixedly mounted on the second magnetic yoke; wherein the first permanent magnet, the second permanent magnet, the third permanent magnet, and the fourth permanent magnet are orderly spaced and distributed on a same circumference centered on the fulcrum; radial end faces of the first permanent magnet and the fourth permanent magnet have a same polarity; radial end faces of the second permanent magnet and the third permanent magnet have a same polarity; the radial end faces of the first permanent magnet and the second permanent magnet have opposite polarities and are provided corresponding to an end face of the first support leg; the radial end faces of the third permanent magnet and the fourth permanent magnet have opposite polarities and are provided corresponding to an end face of the second support leg; and
   end faces of the first permanent magnet and the second permanent magnet correspondingly have an air gap with the end face of the first leg; end faces of the third permanent magnet and the fourth permanent magnet correspondingly have an air gap with the end face of the second leg.

2. The oscillating motor of claim 1, wherein a gap between the first permanent magnet and the second permanent magnet is smaller than a width of the end face of the first support leg; and a gap between the third permanent magnet and the fourth permanent magnet is smaller than a width of the end face of the second support leg.

3. The oscillating motor of claim 1, wherein a circular arc surface is provided at the end faces of the first support leg matching with a circumference formed when the first permanent magnet and the second permanent magnet swing and a circular arc surface is provided at the end faces of the second support leg matching with a circumference formed when the third permanent magnet and the fourth permanent magnet swing.

4. The oscillating motor of claim 1, wherein an elastic body is provided on both sides of the swing arm for absorbing a moment of inertia of the swing arm in a swing position.

5. The oscillating motor of claim 4, wherein the elastic body is a silicone member or a rubber member having a shape of sphere, elliptical sphere, cylinder, elliptical cylinder or semicircle.

6. The oscillating motor of claim 1, wherein a detecting element for detecting a in-position state of the first permanent magnet or the fourth permanent magnet is respectively provided at an outer side of the U-shaped magnetic yoke and on a moving track of the first permanent magnet and/or the fourth permanent magnet; and the detecting element is connected to the control circuit.

7. The oscillating motor of claim 6, wherein the detecting element is a HALL element.

8. The oscillating motor of claim 1, wherein the oscillating motor further comprises a resonant elastic member, wherein an end of the resonant elastic member is fixed at the fulcrum of the swing arm and the other end the resonant elastic member is connected to the outer arm or the inner arm.

9. The oscillating motor of claim 1, wherein the force output portion with an arc-shaped outer wall is provided at the outer arm.

10. The oscillating motor of claim 1, wherein a connecting rod for force output is provided at the outer arm and/or the inner arm; and the connecting rod is perpendicular to a swinging plane of the swing arm.

11. An electric clipper, comprising an oscillating motor and a cutter head;
wherein the oscillating motor comprises:
a U-shaped magnetic yoke having a first support leg and a second support leg, and the first support leg and the second support leg are wound with coils;
a control circuit electrically connected to the coils and generating alternating pulses to generate alternating magnetic poles at end faces of the first support leg and the second support leg of the U-shaped magnetic yoke;
a swing arm swingable around a fulcrum; wherein the first support leg and the second support leg respectively extend outward from a base portion of the U-shaped magnetic yoke so as to form a U-shaped structure; the swing arm is substantially arranged in an extending direction of the first support leg and the second support leg; the swing arm is bounded by the fulcrum, an end of the swing arm close to the U-shaped magnetic yoke is an inner arm and the other end of the swing arm remote from the U-shaped magnetic yoke is an outer arm; the inner arm levers the outer arm to swing around the fulcrum in a swinging plane where the swing arm locates under the action of electromagnetic force;
a second magnetic yoke mounted at one end of the inner arm close to the U-shaped magnetic yoke for forming magnetic pathways; wherein the second magnetic yoke and the swing arm form a T-shaped structure; and
a first permanent magnet, a second permanent magnet, a third permanent magnet, and a fourth permanent magnet being fixedly mounted on the second magnetic yoke; wherein the first permanent magnet, the second permanent magnet, the third permanent magnet, and the fourth permanent magnet are orderly spaced and distributed on a same circumference centered on the fulcrum; radial end faces of the first permanent magnet and the fourth permanent magnet have a same polarity; radial end faces of the second permanent magnet and the third permanent magnet have a same polarity; the radial end faces of the first permanent magnet and the second permanent magnet have opposite polarities and are provided corresponding to an end face of the first support leg; the radial end faces of the third permanent magnet and the fourth permanent magnet have opposite polarities and are provided corresponding to an end face of the second support leg; end faces of the first permanent magnet and the second permanent magnet correspondingly have an air gap with the end face of the first leg; end faces of the third permanent magnet and the fourth permanent magnet correspondingly have an air gap with the end face of the second leg;
wherein the cutter head is connected to the outer arm of the swing arm;
the force output portion is provided at the outer arm; the force output portion has an arc-shaped outer wall; a toggle connecting body is provided at the cutter head; a groove matching the force output portion is provided at the toggle connecting body; and the force output portion is mounted within the groove.

* * * * *